(12) United States Patent
Kuehner et al.

(10) Patent No.: US 12,128,908 B2
(45) Date of Patent: Oct. 29, 2024

(54) SYSTEMS AND METHODS FOR ASSISTING AN OPERATOR IN OPERATING VEHICLE CONTROLS

(71) Applicant: Woven by Toyota, Inc., Tokyo (JP)

(72) Inventors: Manuel Ludwig Kuehner, Mountain View, CA (US); Hiroshi Yasuda, San Francisco, CA (US)

(73) Assignee: Woven by Toyota, Inc., Tokyo (JP)

( * ) Notice: Subject to any disclaimer, the term of this patent is extended or adjusted under 35 U.S.C. 154(b) by 122 days.

(21) Appl. No.: 17/972,027

(22) Filed: Oct. 24, 2022

(65) Prior Publication Data
US 2024/0132080 A1 Apr. 25, 2024
US 2024/0227822 A9 Jul. 11, 2024

(51) Int. Cl.
*B60W 50/00* (2006.01)
*B60Q 5/00* (2006.01)
*B60W 50/14* (2020.01)
*B60W 50/16* (2020.01)

(52) U.S. Cl.
CPC ......... *B60W 50/0098* (2013.01); *B60Q 5/005* (2013.01); *B60W 50/14* (2013.01); *B60W 50/16* (2013.01); *B60W 2050/146* (2013.01)

(58) Field of Classification Search
CPC .. B60W 50/0098; B60W 50/14; B60W 50/16; B60W 2050/146; B60Q 5/005
See application file for complete search history.

(56) References Cited

U.S. PATENT DOCUMENTS

| | | | |
|---|---|---|---|
| 6,297,818 B1 | 10/2001 | Ulrich et al. | |
| 7,295,904 B2 | 11/2007 | Kanevsky et al. | |
| 8,989,916 B2 | 3/2015 | Tippelhofer et al. | |
| 9,383,000 B2 | 7/2016 | Tippelhofer et al. | |
| 2003/0071859 A1 | 4/2003 | Takami et al. | |
| 2006/0155547 A1* | 7/2006 | Browne | G10L 15/26 704/E15.045 |
| 2010/0101921 A1 | 4/2010 | Howie et al. | |
| 2016/0167661 A1* | 6/2016 | Kuehne | B60W 30/18163 701/36 |
| 2019/0147261 A1* | 5/2019 | Hoshina | G10L 15/22 382/118 |
| 2020/0001869 A1* | 1/2020 | Lotz | B60W 30/146 |

OTHER PUBLICATIONS

P. Green, "Automobile Multifunction Stalk Controls : Literature, Hardware and Human Factors Review", University of Michigan Highway Safety Research Institute, Dec. 1979. 328 pages. https://deepblue.lib.umich.edu/bitstream/handle/2027.42/488/43862.0001.001.pdf?sequence=2.

* cited by examiner

*Primary Examiner* — Nabil H Syed
*Assistant Examiner* — Cal J Eustaquio
(74) *Attorney, Agent, or Firm* — Christopher G. Darrow; Darrow Mustafa PC

(57) ABSTRACT

Systems and methods for assisting an operator in operating vehicle controls are disclosed herein. One embodiment detects that an operator is touching a control in a vehicle and automatically takes, in response to the operator touching the control, one or more actions to assist the operator with regard to the vehicle being a left-hand-drive vehicle or a right-hand-drive vehicle.

20 Claims, 5 Drawing Sheets

SYSTEMS AND METHODS FOR ASSISTING AN OPERATOR IN OPERATING VEHICLE CONTROLS

TECHNICAL FIELD

The subject matter described herein generally relates to vehicles and, more particularly, to systems and methods for assisting an operator in operating vehicle controls.

BACKGROUND

Switching from driving a left-hand-drive (LHD) vehicle to driving a right-hand-drive (RHD) vehicle or vice versa can be challenging and even pose a safety risk to tourists and business travelers. One reason is that the controls (e.g., stalks/levers) for activating turn signals and windshield wipers are swapped in their positions in LHD vehicles compared with RHD vehicles. For example, in a LHD vehicle, the turn-signal stalk is generally on the left side of the steering column, and the windshield-wiper stalk is on the right side. In a RHD vehicle, those positions are reversed. That difference can lead to a driver reaching for the wrong control. Such a mistake can impact safety. For example, the driver might not signal quickly enough (e.g., prior to a lane change) to communicate the driver's intentions to the drivers of other vehicles, or the driver might not clear the windshield quickly enough in response to a sudden, heavy rainstorm.

SUMMARY

An example of a system for assisting an operator in operating vehicle controls is presented herein. The system comprises a processor and a memory storing machine-readable instructions that, when executed by the processor, cause the processor to detect that the operator is touching a control in a vehicle. The memory also stores machine-readable instructions that, when executed by the processor, cause the processor to take, in response to the operator touching the control, one or more actions automatically to assist the operator with regard to the vehicle being a left-hand-drive vehicle or a right-hand-drive vehicle.

Another embodiment is a non-transitory computer-readable medium for assisting an operator in operating vehicle controls and storing instructions that, when executed by a processor, cause the processor to detect that the operator is touching a control in a vehicle. The instructions also cause the processor to take, in response to the operator touching the control, one or more actions automatically to assist the operator with regard to the vehicle being a left-hand-drive vehicle or a right-hand-drive vehicle.

Another embodiment is a method of assisting an operator in operating vehicle controls. The method includes detecting that an operator is touching a control in a vehicle. The method also includes taking, in response to the operator touching the control, one or more actions automatically to assist the operator with regard to the vehicle being a left-hand-drive vehicle or a right-hand-drive vehicle.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
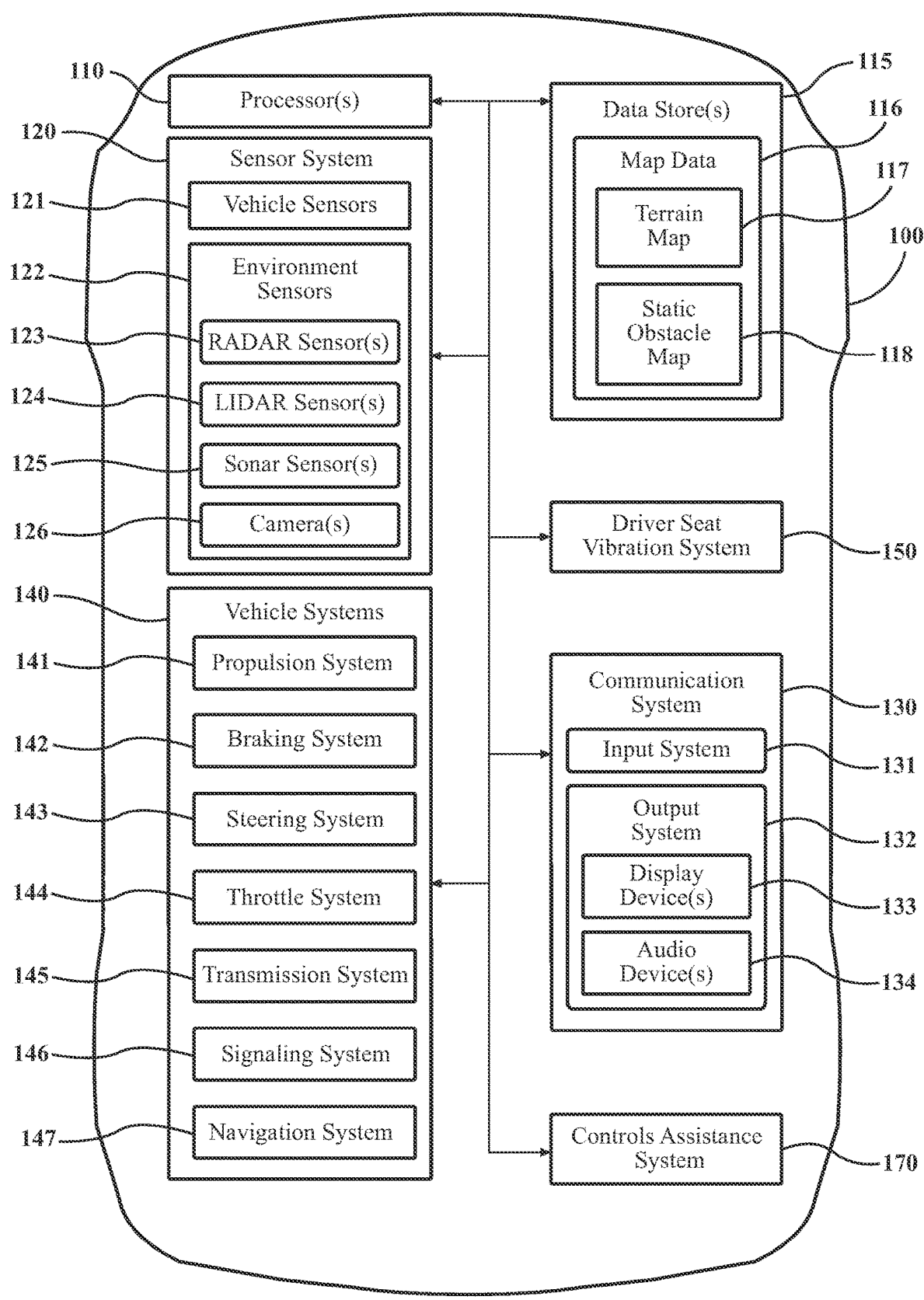
FIG. 1 illustrates one embodiment of a vehicle within which systems and methods disclosed herein may be implemented.

In various embodiments described herein, a controls assistance system in a vehicle adaptively prevents or compensates for a driver actuating the incorrect control in a pair of controls whose positions are swapped in a left-hand-drive (LHD) vehicle compared with a right-hand-drive (RHD) vehicle. One example of such a pair of controls is a turn-signal (or indicator) control and a windshield-wiper control. The techniques disclosed herein can be applied to any other pair of controls whose positions are interchanged between LHD and RHD vehicles.

In one embodiment, the system detects that the operator of a vehicle is touching a control of the type just described. In response to the detected touch (contact, grasp, physical-operation characteristics, tactile gesture, etc.), the system plays a characteristic sound associated with the function governed by the touched control to inform the operator of the function that will be activated, if the operator proceeds to actuate the control. That is, the system plays an audible preview suggestive of the function associated with the touched control without activating the function before the operator actuates the touched control. If the operator has reached for the wrong control, this gives the operator an opportunity to reach instead for the other control in the applicable pair of controls to avoid activating the incorrect vehicle function.

In another embodiment, the system detects that the operator of a vehicle is touching a control of the type described above. In response to the detected touch, the system displays a characteristic icon associated with the function governed by the touched control to inform the operator of the function that will be activated, if the operator proceeds to actuate the control. That is, the system provides a visual preview suggestive of the function associated with the touched control without activating the function before the operator actuates the touched control. If the operator has reached for the wrong control, this gives the operator an opportunity to reach instead for the other control in the applicable pair of controls to avoid activating the incorrect vehicle function.

In another embodiment, the system detects that the operator of a vehicle is touching a control of the type described above. In response to the detected touch, the system vibrates at least a portion of the operator (driver) seat of the vehicle in a manner that is suggestive of the function governed by the touched control to inform the operator of the function that will be activated, if the operator proceeds to actuate the control. That is, the system provides a felt vibratory preview suggestive of the function associated with the touched control without activating the function before the operator actuates the touched control. If the operator has reached for the wrong control, this gives the operator an opportunity to reach instead for the other control in the applicable pair of controls to avoid activating the incorrect vehicle function.

In yet another embodiment, the system detects that the operator of a vehicle is touching a control of the type described above, specifically a turn-signal stalk or a windshield-wiper stalk. Additionally, the system detects that the operator is touching the stalk in a particular manner indicating that the operator intended to reach for the other stalk (suggesting LHD vs. RHD confusion). For example, the system might detect that the operator is touching the bottom surface or the top surface of the windshield-wiper stalk (in mistaken preparation to push up or down on the stalk to activate a turn signal) or that the operator is pinching the distal end of the turn-signal stalk (in mistaken preparation to exert a twisting force on the distal end to adjust wiper frequency). Depending on the particular variation of this embodiment, the system, in response to detecting the incorrect manner of touch (touch gesture), performs one or more of the following actions: (1) emits an audible warning; (2) displays a visual warning; (3) provides a vibratory warning felt by the operator; and (4) in response to the operator proceeding to actuate the touched control, activates the function governed by the other stalk in the applicable pair of stalks to compensate for the operator's error (i.e., the functionality of the two stalks is automatically, temporarily swapped). In some embodiments, the audible, visual, or vibratory warning coincides with the audible, visual, or vibratory preview of function associated with the touched stalk, as described above.

Referring to FIG. 1, an example of a vehicle 100, in which systems and methods disclosed herein can be implemented, is illustrated. As used herein, a "vehicle" is any form of motorized transport. For example, in some embodiments, the vehicle 100 is an automobile. The vehicle 100 can include a controls assistance system 170 or capabilities to support or interact with the controls assistance system 170 and thus benefits from the functionality discussed herein. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1.

In some arrangements, the vehicle 100 may be implemented without one or more of the elements shown in FIG. 1, including controls assistance system 170. While the various elements are shown as being located within the vehicle 100 in FIG. 1, it will be understood that one or more of these elements can be located external to the vehicle 100 or be part of a system that is separate from vehicle 100. Further, the elements shown may be physically separated by large distances.

Some of the possible elements of the vehicle 100 are shown in FIG. 1 and will be described in connection with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

As shown in FIG. 1, in some embodiments, vehicle 100 includes a sensor system 120. Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. Vehicle sensors 121 can also include touch sensors that can detect that a vehicle operator is touching a particular control (e.g., a turn-signal stalk or a windshield-wiper stalk) within vehicle 100. In some embodiments, the touch sensors are capacitive touch sensors. In other embodiments, the touch sensors are position or force sensors that can detect very small displacements (the slight pressure of the operator's fingers/hand on the control). In yet another embodiment, the touch sensors are optical (e.g., infrared ("IR")) sensors. In general, the touch sensors occupy positions on the applicable controls where it is anticipated that an operator will touch the controls. It is generally not necessary for the entire surface of a control to be occupied by touch sensors. As an alternative to touch sensors, in one embodiment, environment sensors 122, such as one or more cameras 126 in the passenger compartment of vehicle 100, can be used to detect that the operator is touching a particular control.

As also shown in FIG. 1, vehicle 100 can include a communication system 130 that includes an input system 131 and an output system 132. As discussed further below, some embodiments of a controls assistance system 170 use the display device(s) 133 and/or the audio device(s) 134 to communicate information to the operator of vehicle 100. In another embodiment, vehicle 100 includes a driver seat vibration system 150 that causes at least a portion of the driver's (operator's) seat to vibrate in a manner that can be felt by the operator. This is discussed further below.

Figure 2:
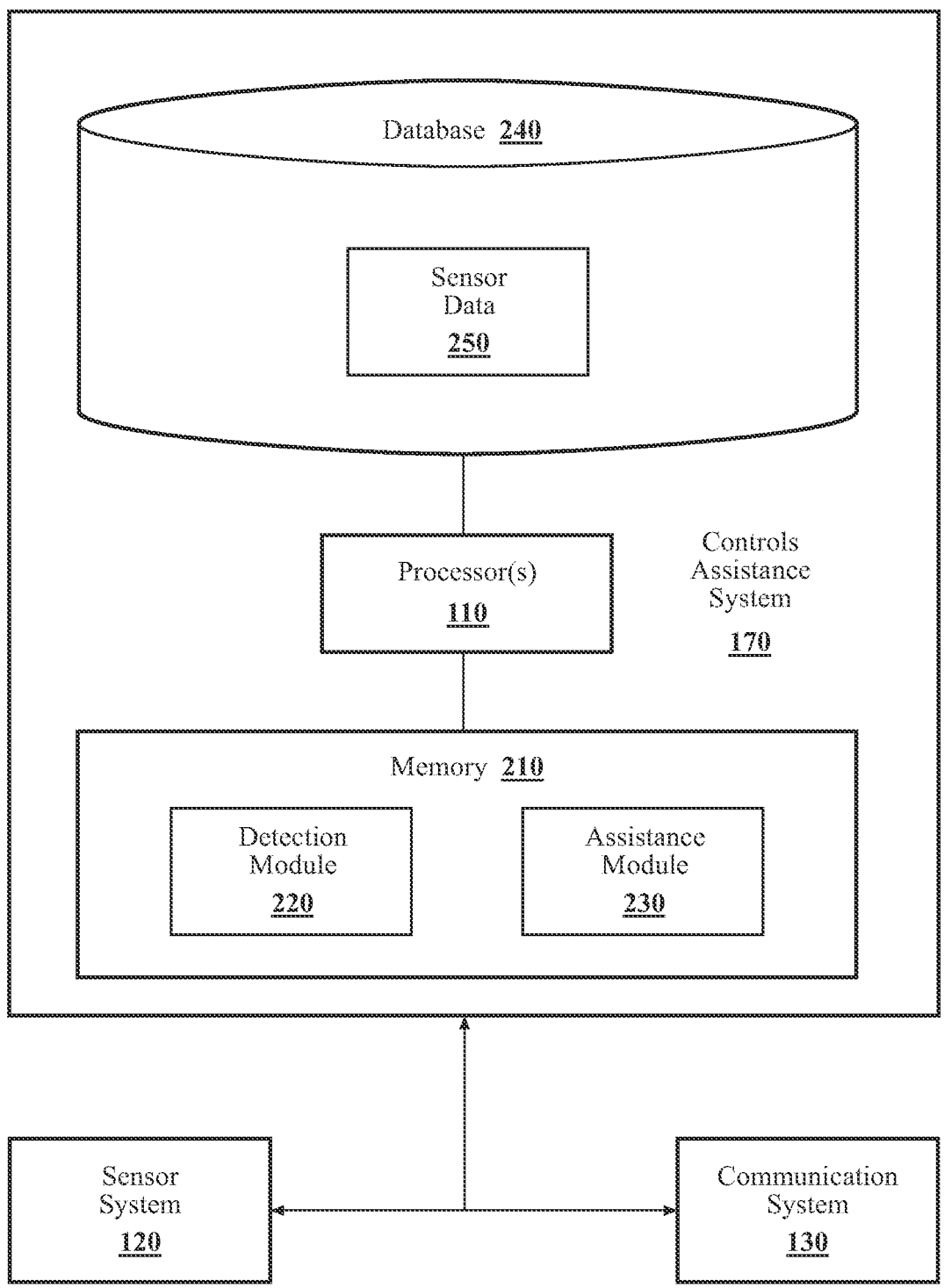
FIG. 2 illustrates one embodiment of a controls assistance system.

FIG. 2 is a block diagram of a controls assistance system 170, in accordance with an illustrative embodiment of the invention. Controls assistance system 170 is an optional feature in vehicle 100 that an operator can enable or disable via the vehicle's settings/options user interface. Rental car companies, in particular, might choose to enable, by default, controls assistance system 170 in vehicles rented to tourists and business travelers from regions that have different vehicle configurations (RHD or LHD) from those driven in the local area.

Controls assistance system 170 is shown as including one or more processors 110 from the vehicle 100 of FIG. 1. Accordingly, the one or more processors 110 may be a part of the controls assistance system 170, the controls assistance system 170 may include one or more processors that are separate from the one or more processors 110 of the vehicle 100, or the controls assistance system 170 may access the one or more processors 110 through a data bus or another communication path. In one embodiment, the controls assistance system 170 includes a memory 210 that stores a detection module 220 and an assistance module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the one or more processors 110, cause the one or more processors 110 to perform the various functions disclosed herein. In performing its various functions, controls assistance system 170 can store various kinds of data such as sensor data 250 in a database 240. Sensor data 250 can include, for example, data from the touch sensors discussed above. As shown in FIG. 2, controls assistance system 170 can communicate and interface with other systems or subsystems of vehicle 100, such as sensor system 120 and communication system 130.

Detection module 220 generally includes machine-readable instructions that, when executed by the one or more processors 110, cause the one or more processors 110 to detect that the operator (driver) of vehicle 100 is touching a control in the vehicle with his or her hand/fingers. As discussed above, the touched control is one of a pair of controls whose positions are swapped in a LHD vehicle compared with a RHD vehicle. One example of such a pair of controls is a turn-signal (indicator) control and a windshield-wiper control. In some embodiments, the turn-signal control is a turn-signal stalk, and the windshield-wiper control is a windshield-wiper stalk. As mentioned above, the principles disclosed herein can be applied to other pairs of controls (buttons, switches, knobs, dials, etc.) whose positions are swapped in LHD compared with RHD vehicles.

Detection module 220 detects that the operator is touching the control via one or more touch sensors integrated with the control, as discussed above. This is illustrated in FIG. 3.

Figure 3:
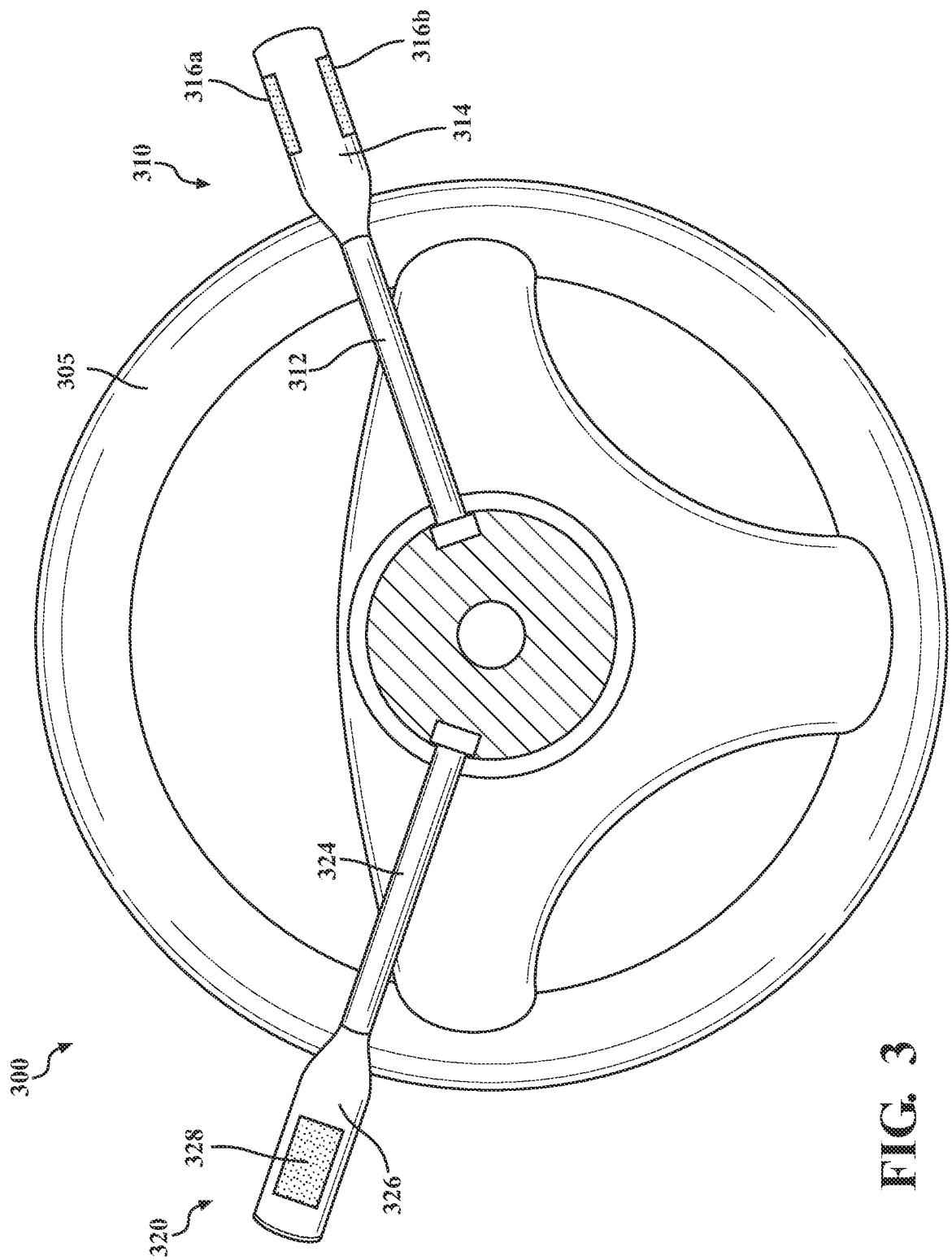
FIG. 3 is a rear plan view of a steering column and wheel, in accordance with an illustrative embodiment of the invention.

FIG. 3 is a rear plan view of a steering column and wheel 300, in accordance with an illustrative embodiment of the invention. Steering column and wheel 300 includes a steering wheel 305, a turn-signal control 310, and a windshield-wiper control 320. In the embodiment of FIG. 3, turn-signal control 310 includes a turn-signal stalk 312, distal end portion 314, and touch-sensitive regions that include touch sensors 316a and 316b on the top and bottom surfaces, respectively, of distal end portion 314. Windshield-wiper control 320 includes a windshield-wiper stalk 324, a distal end portion 326, and at least one region of distal end portion 326 that includes a touch sensor 328. FIG. 3 depicts a steering column and wheel 300 in a LHD vehicle. In a RHD vehicle, the positions of the turn-signal control 310 and windshield-wiper control 320 are reversed from what is shown in FIG. 3.

The number and placement of touch sensors (316a, 316b, and 328) shown in FIG. 3 are merely illustrative. In general, touch sensors are located where the operator of vehicle 100 is most likely to touch a given control, taking into account that an operator might touch the control in a manner that is consistent or inconsistent with the functionality governed by the control, due to confusion caused by vehicle 100 being LHD or RHD. As discussed above, it is generally not necessary for the entire surface of a control to be occupied by touch sensors. The number and placement of touch sensors are discussed further below in connection with FIGS. 5A-5C. As discussed above, the touch sensors (316a, 316b, and 328) on which detection module 220 relies can be, without limitation, capacitive touch sensors, position/force sensors that detect very small displacements, or optical (e.g., IR) sensors, depending on the embodiment.

Referring again to FIG. 2, assistance module 230 generally includes machine-readable instructions that, when executed by the one or more processors 110, cause the one or more processors 110 to take, in response to the operator touching the control, one or more actions automatically to assist the operator with regard to the vehicle 100 being a LHD vehicle or a RHD vehicle. More specifically, assistance module 230 assists the operator with possible confusion arising from a pair of controls whose positions are interchanged in LHD vehicles compared with RHD vehicles, as discussed above. The specific actions that assistance module 230 takes differ, depending on the embodiment. The four different embodiments summarized above are discussed in greater detail below.

In a first embodiment, assistance module 230 includes machine-readable instructions that, when executed by the one or more processors 110, cause the one or more processors 110 to emit a characteristic sound associated with a function governed by the touched control without activating the function. This assumes, of course, that the operator has not yet actuated the control (pushed a stalk up or down, twisted the distal end portion of a stalk, pressed a button or switch, etc.). For example, if detection module 220 detects that the operator is touching a turn-signal control 310 but has not yet actuated it, assistance module 230 might play a sound that is the same or similar to the sound that vehicle 100 normally emits when a turn signal has been activated (e.g., a periodic clicking sound). Similarly, if detection module 220 detects that the operator is touching a windshield-wiper control 320 but has not yet actuated it, assistance module 230 might play the sound of windshield wipers moving back and forth across a windshield or the sound of rain falling. Playing this characteristic "functional preview sound" gives the operator an opportunity to abort actuation of the touched control, if the operator reached for the control in error, and to reach for the correct control (e.g., a stalk on the opposite side of the steering column).

In this first embodiment, assistance module 230 can make use of one or more audio device(s) 134 in communication system 130 (refer to FIG. 1). Preferably, the audio device(s) 134 are part of the low-latency instrument-cluster audio system that vehicle 100 uses to emit important safety-related sounds (e.g., turn-signal sounds, seat-belt-unfastened warning sounds, door-open warning sounds, key-in-the-ignition warning sounds, etc.) because the vehicle's infotainment system might not be powered on. However, in some embodiments, if the infotainment system happens to be powered on and the volume is sufficiently high, assistance module 230 can play the characteristic sounds discussed above via the infotainment system.

Figure 4A:
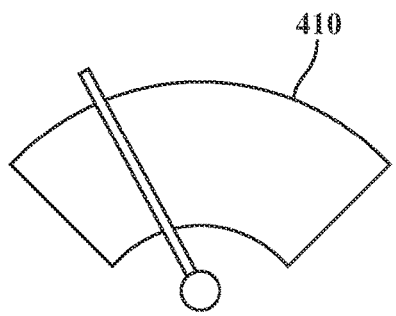
FIG. 4A illustrates an example of a windshield-wiper icon, in accordance with an illustrative embodiment of the invention.
Figure 4B:
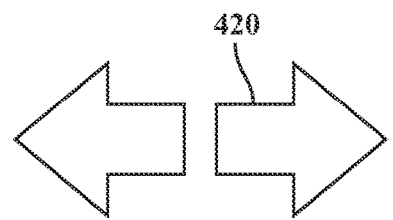
FIG. 4B illustrates an example of a turn-signal icon, in accordance with an illustrative embodiment of the invention.

In a second embodiment, assistance module 230 includes machine-readable instructions that, when executed by the one or more processors 110, cause the one or more processors 110 to display a characteristic icon associated with the function governed by the touched control without activating the function. This assumes, of course, that the operator has not yet actuated the control (pushed a stalk up or down, twisted the distal end portion of a stalk, pressed a button or switch, etc.). For example, if detection module 220 detects that the operator is touching a windshield-wiper control 320 but has not yet actuated it, assistance module 230 might display an icon similar to windshield-wiper icon 410 shown in FIG. 4A. Similarly, if detection module 220 detects that the operator is touching a turn-signal control 310 but has not yet actuated it, assistance module 230 might display an icon similar to turn-signal icon 420 in FIG. 4B. Displaying such a characteristic "functional preview icon" gives the operator an opportunity to abort actuation of the touched control, if the operator reached for the control in error, and to reach for the correct control (e.g., a stalk on the opposite side of the steering column). The icons shown in FIGS. 4A and 4B are merely examples. Different icons can be used, depending on the embodiment.

In this second embodiment, assistance module 230 can make use of one or more display device(s) 133 (refer to FIG. 1) in communication system 130. In some embodiments, assistance module 230 displays the characteristic icon on the instrument panel where the operator is likely to see it, or assistance module 230 can display the characteristic icon on a head-up display (HUD). In some embodiments, the windshield in front of the operator or a portion thereof is a HUD.

In a third embodiment, assistance module 230 includes machine-readable instructions that, when executed by the one or more processors 110, cause the one or more processors 110 to vibrate at least a portion of the operator (driver) seat of the vehicle 100 in a manner that is suggestive of the function governed by the touched control without activating the function. This assumes, of course, that the operator has not yet actuated the control (pushed a stalk up or down, twisted the distal end portion of a stalk, pressed a button or switch, etc.). For example, if detection module 220 detects that the operator is touching a turn-signal control 310 but has not yet actuated it, assistance module 230 might vibrate the operator seat or some portion thereof in a periodic, relatively high-amplitude, pulsating manner (suggestive of the turn-signal clicking sound discussed above). Similarly, if detection module 220 detects that the operator is touching a windshield-wiper control 320 but has not yet actuated it, assistance module 230 might vibrate the operator seat or some portion thereof in a manner that suggests falling rain. For example, high-frequency, relatively low-amplitude, and somewhat randomized vibrations could suggest falling rain. The "functional preview vibratory pattern" gives the operator an opportunity to abort actuation of the touched control, if the operator reached for the control in error, and to reach for the correct control (e.g., a stalk on the opposite side of the steering column). As discussed above, vibrating at least a portion of the operator's seat can be accomplished via driver seat vibration system 150 (refer to FIG. 1).

In a variation involving the above three embodiments, two or more of the above three embodiments can be combined. That is, the one or more actions assistance module 230 takes in response to the operator touching the control can include two or more of (1) emitting a characteristic sound, (2) displaying a characteristic icon, and (3) vibrating at least a portion of the operator's seat.

In a fourth embodiment, the detected touched control is either a turn-signal stalk 312 or a windshield-wiper stalk 324 (refer to FIG. 3). In this embodiment, assistance module 230 includes machine-readable instructions that, when executed by the one or more processors 110, cause the one or more processors 110 to detect a particular manner in which the operator is touching the control and to determine, from the detected particular manner in which the operator is touching the control, that the operator intended to touch a different control (the other stalk of the two stalks 312 and 324 mentioned above) that governs a different function than the function governed by the touched control. In some embodiments, assistance module 230 detects the particular manner in which the operator is touching the control based on sensor data 250 or other information obtained from detection module 220. Three different examples of detecting that an operator is touching the wrong (unintended) stalk are illustrated in FIGS. 5A-5C.

Figure 5A:
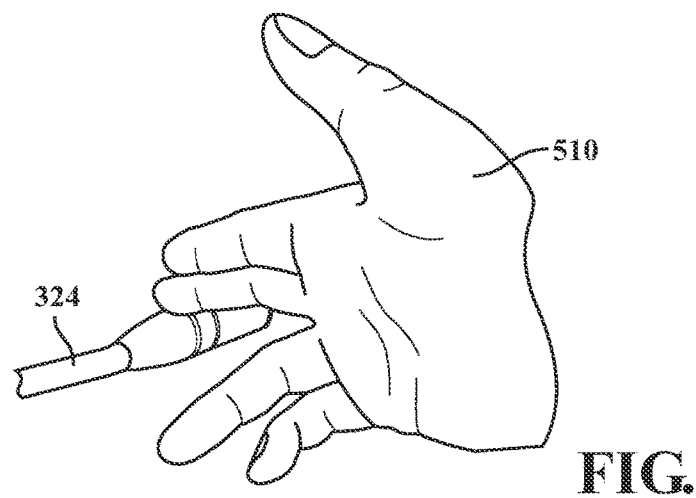
FIG. 5A illustrates an operator of a vehicle mistakenly touching a windshield-wiper stalk on its top surface, in accordance with an illustrative embodiment of the invention.

FIG. 5A illustrates an operator of a vehicle mistakenly touching a windshield-wiper stalk 324 on its top surface, in accordance with an illustrative embodiment of the invention. In FIG. 5A, an operator's hand 510 is shown touching the top surface of the windshield-wiper stalk 324. More specifically, the operator is touching the top surface with the side of a finger. This is the manner in which an operator would typically touch a turn-signal stalk 312 to push down on the stalk to activate a turn signal. Such a touch gesture is unexpected for a windshield-wiper stalk 324, so assistance module 230 identifies the operator's touch as being in error (i.e., assistance module 230 determines that the operator intended to touch the turn-signal stalk 312 instead).

Figure 5B:
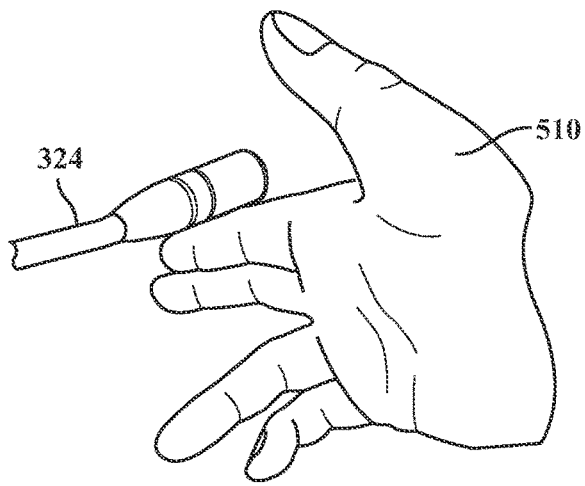
FIG. 5B illustrates an operator of a vehicle mistakenly touching a windshield-wiper stalk on its bottom surface, in accordance with an illustrative embodiment of the invention.

FIG. 5B illustrates an operator of a vehicle mistakenly touching a windshield-wiper stalk 324 on its bottom surface, in accordance with an illustrative embodiment of the invention. In FIG. 5B, an operator's hand 510 is shown touching the bottom surface of the windshield-wiper stalk 324. More specifically, the operator is touching the top surface with the side of a finger. This is the manner in which an operator would typically touch a turn-signal stalk 312 to push up on the stalk to activate a turn signal. Such a touch gesture is unexpected for a windshield-wiper stalk 324, so assistance module 230 again identifies the operator's touch as being in error (i.e., assistance module 230 determines that the operator intended to touch the turn-signal stalk 312 instead).

Figure 5C:
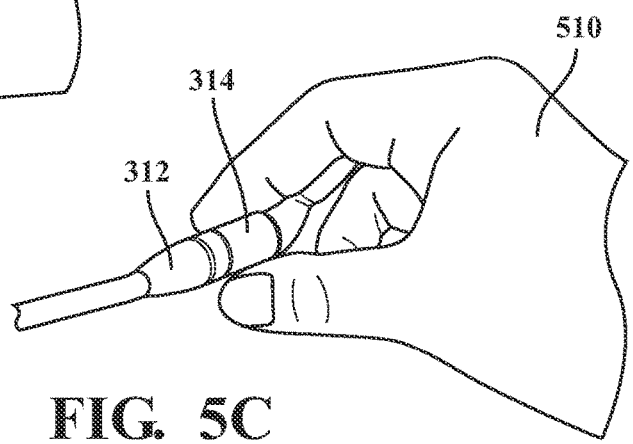
FIG. 5C illustrates an operator of a vehicle mistakenly pinching the distal end of a turn-signal stalk, in accordance with an illustrative embodiment of the invention.

FIG. 5C illustrates an operator of a vehicle mistakenly pinching the distal end portion 314 of a turn-signal stalk 312, in accordance with an illustrative embodiment of the invention. In FIG. 5C, an operator's hand 510 is shown touching the distal end portion 314 of the turn-signal stalk 312. More specifically, the operator is pinching the distal end portion 314 with a thumb and one or two fingers. This is the manner in which an operator would typically touch a windshield-wiper stalk 324 to adjust the frequency of the windshield wipers (e.g., to adjust the intermittence interval). This manner of touching the distal end portion 314 can be detected via touch sensors integrated with distal end portion 314, as discussed above. Specifically, the pinching gesture can be identified by detecting multiple points of contact between the operator's thumb and fingers and the distal end portion 314, in a predictable pattern. Such a gesture is, however, unexpected for a turn-signal stalk 312, so assistance module 230 identifies the operator's touch as being in error (i.e., assistance module 230 determines that the operator intended to pinch the distal end portion 326 of the windshield-wiper stalk 324 instead).

Once assistance module 230 has determined, from the detected particular manner in which the operator is touching the control, that the operator intended to touch a different control (the other stalk in the turn-signal/windshield-wiper pair of stalks) that governs a different function than the function governed by the touched control, assistance module 230 can perform one or more of the following actions, depending on the embodiment: (1) emitting an audible warning; (2) displaying a visual warning; (3) providing a vibratory warning (a warning that the operator can feel as a vibration); and (4) in response to the operator proceeding to actuate the touched control by pushing up or down on the touched stalk or exerting a twisting force on the distal end of the touched stalk, activating the "different function" governed by the other stalk in the pair of stalks (the stalk the operator did not touch). The fourth action just mentioned compensates for the operator's error in reaching for and actuating the incorrect stalk by temporarily swapping the functions governed by the respective stalks. In such an embodiment, the operator can activate the turn signals via the windshield-wiper stalk 324 and can control the frequency of the windshield wipers via the turn-signal stalk 312.

In a variation of the fourth embodiment, the audible warning, visual warning, and vibratory warning coincide, respectively, with the characteristic sound discussed above in connection with the first embodiment, the displaying of a characteristic icon discussed above in connection with the second embodiment, and the vibration of at least a portion of the operator's seat discussed above in connection with the third embodiment.

Figure 6:
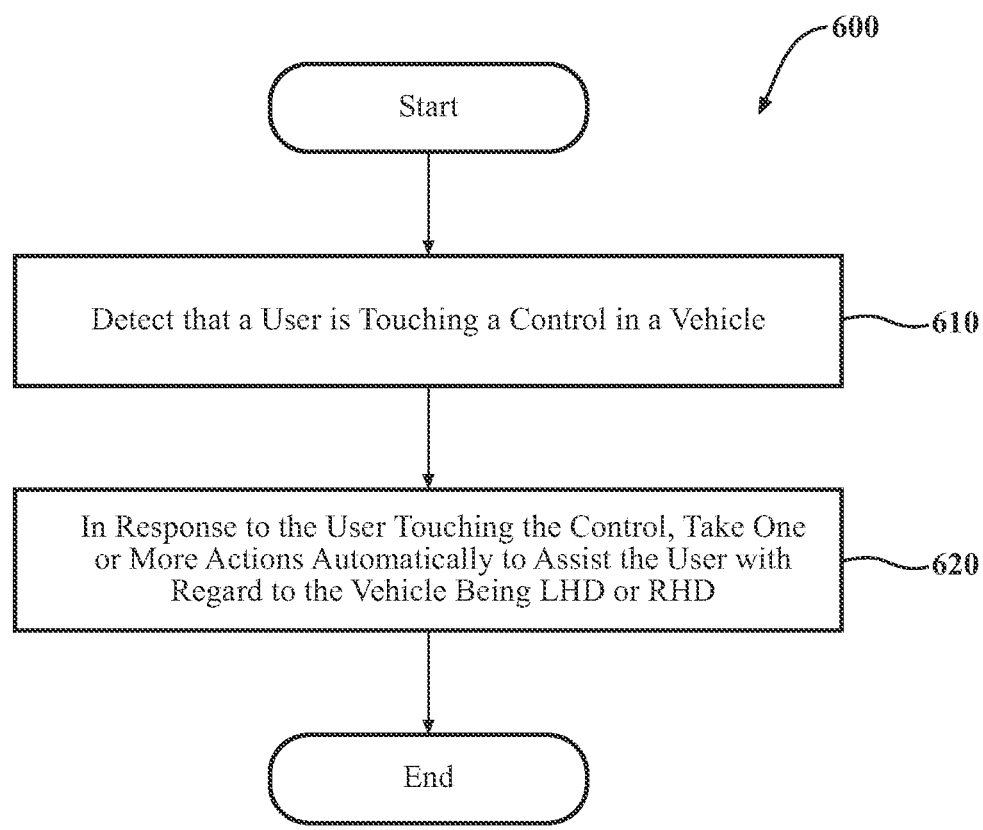
FIG. 6 is a flowchart of a method of assisting an operator in operating vehicle controls, in accordance with an illustrative embodiment of the invention.

FIG. 6 is a flowchart of a method 600 of assisting an operator in operating vehicle controls, in accordance with an illustrative embodiment of the invention. Method 600 will be discussed from the perspective of the controls assistance system 170 shown in FIG. 2. While method 600 is discussed in combination with controls assistance system 170, it should be appreciated that method 600 is not limited to being implemented within controls assistance system 170, but controls assistance system 170 is instead one example of a system that may implement method 600.

At block 610, detection module 220 detects that the operator is touching a control in a vehicle 100. As discussed above, the touched control is one of a pair of controls whose positions are swapped in a LHD vehicle compared with a RHD vehicle. One example of such a pair of controls is a turn-signal (indicator) control 310 and a windshield-wiper control 320. In some embodiments, the turn-signal control 310 is or includes a turn-signal stalk 312, and the windshield-wiper control 320 is or includes a windshield-wiper stalk 324. As mentioned above, the principles disclosed herein can be applied to other pairs of controls whose positions are swapped in LHD vehicles relative to RHD vehicles. As also discussed above, detection module 220 detects that the operator is touching the control via one or more touch sensors (e.g., see Elements 316a, 316b, and 328 in FIG. 3) integrated with the control.

At block 620, assistance module 230 takes, in response to the operator touching the control, one or more actions automatically to assist the operator with regard to the vehicle 100 being a LHD vehicle or a RHD vehicle.

As discussed above, the one or more actions taken by assistance module 230 at block 620 differ, depending on the embodiment. The four embodiments discussed above are as follows:
1. Emitting a characteristic sound associated with a function governed by the touched control without activating the function;
2. Displaying a characteristic icon associated with the function governed by the touched control without activating the function;
3. Vibrating at least a portion of the operator's (driver's) seat in a manner suggestive of the function governed by the control without activating the function; and
4. Determining, from the detected particular manner in which the operator is touching the control, that the operator intended to touch a different control that governs a different function than the function governed by the control and performing one or more of (a) emitting an audible warning, (b) displaying a visual warning, (c) providing a vibratory warning, and (d) activating the different function in response to the operator proceeding to actuate the touched control.

As discussed above, there can be variations of the above embodiments. For example, in a variation involving the first three embodiments, two or more of those three embodiments can be combined. That is, the one or more actions assistance module 230 takes in response to the operator touching the control can include two or more of (1) emitting a characteristic sound, (2) displaying a characteristic icon, and (3) vibrating at least a portion of the operator's seat.

FIG. 1 will now be discussed in full detail as an example vehicle environment within which the systems and methods disclosed herein may be implemented. The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with other road users (ORUs), or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 can be operatively connected to communicate with the various vehicle systems 140 and/or individual components thereof. For example, returning to FIG. 1, the one or more processors 110 can be in communication to send and/or receive information from the various vehicle systems 140 to control the movement, speed, maneuvering, heading, direction, etc. of the vehicle 100. The one or more processors 110 may control some or all of these vehicle systems 140.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-6, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for assisting an operator in operating vehicle controls, the system comprising:
   a processor; and
   a memory storing machine-readable instructions that, when executed by the processor, cause the processor to:
      detect that the operator is touching a control in a vehicle, wherein the control is one of a pair of controls whose positions with respect to a steering column are swapped in a left-hand-drive vehicle compared with a right-hand-drive vehicle; and
      take, in response to the operator touching the control, one or more actions automatically to assist the operator in actuating a correct control of the pair of controls.

2. The system of claim 1, wherein the one or more actions include one or more of:
   emitting a characteristic sound associated with a function governed by the control without activating the function;
   displaying a characteristic icon associated with the function governed by the control without activating the function; and
   vibrating at least a portion of an operator seat of the vehicle in a manner that is suggestive of the function governed by the control without activating the function.

3. The system of claim 2, wherein the control is one of a turn-signal control and a windshield-wiper control.

4. The system of claim 3, wherein the turn-signal control is a turn-signal stalk and the windshield-wiper control is a windshield-wiper stalk.

5. The system of claim 1, wherein the control is one of a turn-signal stalk and a windshield-wiper stalk.

6. The system of claim 5, wherein the one or more actions include:
   detecting a particular manner in which the operator is touching the control;
   determining, from the detected particular manner in which the operator is touching the control, that the operator intended to touch a different control that governs a different function than a function governed by the control; and
   performing one or more of:
      emitting an audible warning;
      displaying a visual warning;
      providing a vibratory warning; and
      activating the different function in response to the operator proceeding to actuate the control.

7. The system of claim 6, wherein:
   the audible warning includes a characteristic sound associated with the function governed by the control;
   the visual warning includes a characteristic icon associated with the function governed by the control; and
   the vibratory warning includes vibrating at least a portion of an operator seat of the vehicle in a manner that is suggestive of the function governed by the control.

8. The system of claim 6, wherein the detected particular manner in which the operator is touching the control is one of:
   touching a bottom surface of the windshield-wiper stalk;
   touching a top surface of the windshield-wiper stalk; and
   pinching a distal end of the turn-signal stalk.

9. A non-transitory computer-readable medium for assisting an operator in operating vehicle controls and storing instructions that, when executed by a processor, cause the processor to:
  detect that the operator is touching a control in a vehicle, wherein the control is one of a pair of controls whose positions with respect to a steering column are swapped in a left-hand-drive vehicle compared with a right-hand-drive vehicle; and
  take, in response to the operator touching the control, one or more actions automatically to assist the operator in actuating a correct control of the pair of controls.

10. The non-transitory computer-readable medium of claim 9, wherein the control is one of a turn-signal control and a windshield-wiper control and the one or more actions include one or more of:
  emitting a characteristic sound associated with a function governed by the control without activating the function;
  displaying a characteristic icon associated with the function governed by the control without activating the function; and
  vibrating at least a portion of an operator seat of the vehicle in a manner that is suggestive of the function governed by the control without activating the function.

11. The non-transitory computer-readable medium of claim 9, wherein the control is one of a turn-signal stalk and a windshield-wiper stalk and the one or more actions include:
  detecting a particular manner in which the operator is touching the control;
  determining, from the detected particular manner in which the operator is touching the control, that the operator intended to touch a different control that governs a different function than a function governed by the control; and
  performing one or more of:
    emitting an audible warning;
    displaying a visual warning;
    providing a vibratory warning; and
    activating the different function in response to the operator proceeding to actuate the control.

12. The non-transitory computer-readable medium of claim 11, wherein the detected particular manner in which the operator is touching the control is one of:
  touching a bottom surface of the windshield-wiper stalk;
  touching a top surface of the windshield-wiper stalk; and
  pinching a distal end of the turn-signal stalk.

13. A method, comprising:
  detecting that an operator is touching a control in a vehicle, wherein the control is one of a pair of controls whose positions with respect to a steering column are swapped in a left-hand-drive vehicle compared with a right-hand-drive vehicle; and
  taking, in response to the operator touching the control, one or more actions automatically to assist the operator in actuating a correct control of the pair of controls.

14. The method of claim 13, wherein the one or more actions include one or more of:
  emitting a characteristic sound associated with a function governed by the control without activating the function;
  displaying a characteristic icon associated with the function governed by the control without activating the function; and
  vibrating at least a portion of an operator seat of the vehicle in a manner that is suggestive of the function governed by the control without activating the function.

15. The method of claim 14, wherein the control is one of a turn-signal control and a windshield-wiper control.

16. The method of claim 15, wherein the turn-signal control is a turn-signal stalk and the windshield-wiper control is a windshield-wiper stalk.

17. The method of claim 13, wherein the control is one of a turn-signal stalk and a windshield-wiper stalk.

18. The method of claim 17, wherein the one or more actions include:
  detecting a particular manner in which the operator is touching the control;
  determining, from the detected particular manner in which the operator is touching the control, that the operator intended to touch a different control that governs a different function than a function governed by the control; and
  performing one or more of:
    emitting an audible warning;
    displaying a visual warning;
    providing a vibratory warning; and
    activating the different function in response to the operator proceeding to actuate the control.

19. The method of claim 18, wherein:
the audible warning includes a characteristic sound associated with the function governed by the control;
the visual warning includes a characteristic icon associated with the function governed by the control; and
the vibratory warning includes vibrating at least a portion of an operator seat of the vehicle in a manner that is suggestive of the function governed by the control.

20. The method of claim 18, wherein the detected particular manner in which the operator is touching the control is one of:
  touching a bottom surface of the windshield-wiper stalk;
  touching a top surface of the windshield-wiper stalk; and
  pinching a distal end of the turn-signal stalk.

* * * * *